US 8,213,953 B1

(12) United States Patent
Mangal

(10) Patent No.: US 8,213,953 B1
(45) Date of Patent: *Jul. 3, 2012

(54) METHOD AND SYSTEM FOR VOCODER BYPASS BASED ON LOADS IN COVERAGE AREAS OF A WIRELESS WIDE AREA NETWORK

(75) Inventor: Manish Mangal, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1008 days.

This patent is subject to a terminal disclaimer.

(21) Appl. No.: 11/951,630

(22) Filed: Dec. 6, 2007

Related U.S. Application Data

(62) Division of application No. 10/842,795, filed on May 11, 2004, now Pat. No. 7,328,027.

(51) Int. Cl.
*H04W 72/00* (2009.01)
*H04W 40/00* (2009.01)
*H04B 1/38* (2006.01)

(52) U.S. Cl. .................. 455/453; 455/445; 455/560

(58) Field of Classification Search ............. 455/453, 455/414.1, 426.1, 417–420, 423–424, 517–519, 455/445, 452.2, 560; 370/466, 335, 342, 370/329, 328, 338
See application file for complete search history.

(56) References Cited

U.S. PATENT DOCUMENTS

| 5,608,779 | A | 3/1997 | Lev et al. |
|---|---|---|---|
| 5,649,299 | A | 7/1997 | Battin et al. |
| 5,768,308 | A | 6/1998 | Pon et al. |
| 5,793,810 | A | 8/1998 | Han et al. |
| 5,956,673 | A * | 9/1999 | Weaver et al. ............... 704/221 |
| 5,973,810 | A * | 10/1999 | Song .............................. 398/112 |
| 5,987,327 | A | 11/1999 | Lev et al. |
| 5,995,923 | A | 11/1999 | Mermelstein et al. |
| 6,070,089 | A | 5/2000 | Brophy et al. |
| 6,078,809 | A * | 6/2000 | Proctor ........................ 455/416 |
| 6,091,969 | A * | 7/2000 | Brophy et al. ............... 455/560 |
| 6,138,022 | A | 10/2000 | Strawczynski et al. |
| 6,172,974 | B1* | 1/2001 | Tseng et al. .................. 370/357 |
| 6,185,424 | B1 | 2/2001 | Pon et al. |
| 6,215,996 | B1 | 4/2001 | Fujita et al. |

(Continued)

FOREIGN PATENT DOCUMENTS

WO  96/19907 A1  6/1996

(Continued)

OTHER PUBLICATIONS

Graham Rousell, "The Implications of ETSI Tandem Free Operation (TFO) in GSM Networks," Mobile Europe, Sep. 1999.

(Continued)

*Primary Examiner* — Brandon Miller

(57) ABSTRACT

The load of a coverage area in a wireless wide area network can be used as a basis to determine which vocoder to use in establishing a call between a wireless device in that coverage area and a wireless device in a different coverage area. If the load of the coverage area is above a threshold, then a higher-compression vocoder may be used during the call for communications between the wireless device and an access point serving the wireless device in that coverage area. However, if the load of the coverage area is below the threshold, then a lower-compression vocoder may be used during the call for communications between the wireless device and the access point.

14 Claims, 6 Drawing Sheets

U.S. PATENT DOCUMENTS

| | | | |
|---|---|---|---|
| 6,243,590 B1 | 6/2001 | Reddy et al. | |
| 6,256,612 B1 * | 7/2001 | Vo et al. | 704/500 |
| 6,272,358 B1 | 8/2001 | Brent et al. | |
| 6,292,662 B1 | 9/2001 | Ziv et al. | |
| 6,351,495 B1 | 2/2002 | Tarraf | |
| 6,418,147 B1 | 7/2002 | Wiedeman | |
| 6,490,451 B1 | 12/2002 | Denman et al. | |
| 6,501,736 B1 | 12/2002 | Smolik et al. | |
| 6,574,469 B1 | 6/2003 | Xiang et al. | |
| 6,611,694 B1 | 8/2003 | Oltedal et al. | |
| RE38,244 E | 9/2003 | Han et al. | |
| 6,718,183 B1 | 4/2004 | Blust et al. | |
| 6,766,291 B2 * | 7/2004 | Chu et al. | 704/215 |
| 6,785,339 B1 * | 8/2004 | Tahernezhaadi et al. | 375/241 |
| 6,856,954 B1 | 2/2005 | Su | |
| 6,865,391 B1 * | 3/2005 | Oh et al. | 455/445 |
| 6,920,150 B1 | 7/2005 | Pauls et al. | |
| 6,965,947 B1 * | 11/2005 | Hild et al. | 709/246 |
| 6,985,866 B2 * | 1/2006 | Nakagaki | 704/500 |
| 7,023,819 B2 * | 4/2006 | Falsafi | 370/328 |
| 7,120,447 B1 * | 10/2006 | Chheda et al. | 455/453 |
| 7,149,515 B2 * | 12/2006 | Hallin et al. | 455/432.2 |
| 7,174,156 B1 * | 2/2007 | Mangal | 455/406 |
| 7,203,226 B1 * | 4/2007 | Rabipour et al. | 375/222 |
| 7,227,873 B2 * | 6/2007 | Lehtimaki | 370/467 |
| 7,227,888 B2 * | 6/2007 | Lemieux | 375/221 |
| 7,240,000 B2 * | 7/2007 | Harada | 704/212 |
| 7,313,115 B2 * | 12/2007 | Chu | 370/335 |
| 7,328,027 B1 * | 2/2008 | Mangal | 455/453 |
| 7,406,319 B2 * | 7/2008 | Kostic et al. | 455/453 |
| 7,426,180 B2 * | 9/2008 | Xu | 370/229 |
| 7,643,414 B1 * | 1/2010 | Minhazuddin | 370/230 |
| 2001/0006895 A1 * | 7/2001 | Della Mea | 455/453 |
| 2002/0075850 A1 | 6/2002 | Cruz et al. | |
| 2002/0191693 A1 | 12/2002 | Nakagaki | |
| 2003/0012221 A1 | 1/2003 | El-Maleh et al. | |
| 2003/0125960 A1 | 7/2003 | Chu et al. | |
| 2003/0195006 A1 * | 10/2003 | Choong et al. | 455/450 |
| 2003/0210659 A1 * | 11/2003 | Chu et al. | 370/320 |
| 2004/0009787 A1 | 1/2004 | Oh et al. | |
| 2005/0018769 A1 | 1/2005 | Hellwig et al. | |
| 2007/0053348 A1 | 3/2007 | Koistinen | |

FOREIGN PATENT DOCUMENTS

| | | |
|---|---|---|
| WO | 00/31951 A1 | 6/2000 |
| WO | 2004/008652 A1 | 1/2004 |
| WO | 2004/008679 A1 | 1/2004 |

OTHER PUBLICATIONS

3rd Generation Partnership Project 2, "Tandem Free Operation (Stage 1)," 3GPP2 S.R0014, Version 1.0, Dec. 13, 1999.

3rd Generation Partnership Project 2, "CDMA Tandem Free Operation," 3GPP2 A.S0004-B v2.0, Aug. 5, 2002.

U.S. Appl. No. 10/616,679, filed Jul. 10, 2003.

* cited by examiner

METHOD AND SYSTEM FOR VOCODER BYPASS BASED ON LOADS IN COVERAGE AREAS OF A WIRELESS WIDE AREA NETWORK

CROSS-REFERENCE TO RELATED APPLICATIONS

This is a division of application Ser. No. 10/842,795, filed May 11, 2004, which application is incorporated herein by reference.

FIELD OF THE INVENTION

The present invention relates to wireless wide area networks. More specifically, it relates to methods for selecting vocoders to use during calls between wireless devices.

BACKGROUND OF THE INVENTION

Wireless devices often transmit and receive voice and other media in a compressed digital format in order to reduce bandwidth. In particular, a wireless device may receive voice or other media from a user, digitize it, compress the digital signals in accordance with various algorithms, and then transmit the voice or other media in the compressed digital format. A wireless device that receives media in the compressed digital format decodes it in order to uncover the original signal. Wireless devices typically include vocoders to convert the voice or other media between analog and compressed digital formats. A number of different compressed digital formats are commonly used.

One example is the Enhanced Variable Rate Codec ("EVRC"), which supports voice transmission at a data rate of about 8 Kbps. EVRC is described in the TIA/EIA/IS-127-3 standard, "Enhanced Variable Rated Codec, Speech Service Option 3 for Wideband Spread Spectrum Digital Systems." Another example is the Selectable Mode Vocoder ("SMV"), which supports voice transmission at a data rate of about 4 Kbps. SMV is described in the TIA/EIA/IS-893 standard, "Selectable Mode Vocoder Service Option for Wideband Spread Spectrum Communication Systems." SMV is a higher compression format than EVRC as it only requires about half the bandwidth of EVRC. Wireless devices that support the SMV format are typically backward compatible and also support the less efficient EVRC format.

In contrast, circuit-switched telephone networks, such as the public switched telephone network ("PSTN"), typically carry voice or media in an uncompressed digital format, such as a pulse code modulation ("PCM") format. For example, in a typical PCM format, a voice signal is sampled at a rate of 8000 times a second and digitized with an 8-bit resolution, resulting in a 64 Kbps signal. Trunks used in the PSTN are often able to carry many of these 64 Kbps signals at a time in separate channels. For example, a T–1 trunk can carry 24 of these 64 Kbps channels.

Wireless telecommunications systems often use transcoders to convert between the compressed digital formats used by wireless devices and the PCM or other format used by circuit-switched telephone networks. However, using transcoders can result in inefficiencies. For example, in a call that involves two wireless devices, the voice or other media exchanged in the call may be transcoded twice. One transcoder may convert the media from the transmitting wireless device to PCM format for transmission through the PSTN, and another transcoder may convert the media from the PCM format to the compressed media format for transmission to the receiving wireless device. Using transcoders "in tandem" is often undesirable, because each transcoder can add delay to the call and can degrade the quality of the voice or other media.

To address these concerns, various proposals have been made to provide "tandem free operation" ("TFO") in calls between wireless devices in which the transcoders are bypassed and the PSTN carries media in the compressed digital format without transcoding. One such method is described in 3$^{rd}$ Generation Partnership Project 2, "CDMA Tandem Free Operation," 3GPP2 A. S0004-B v2.0 (Aug. 5, 2002). In this method, an inband signaling protocol is used to test if the call is a mobile-to-mobile call, if the wireless devices use the same compressed digital format, and if the systems at both end of the call support tandem free operation. If these tests are successful, the inband signaling protocol establishes a "transparent" digital channel through the PSTN, and the transcoders are bypassed. The media is then carried through the PSTN in the original compressed digital format, which is uses 16 Kbps "TFO frames" that are mapped onto the two least significant bits in a 64 Kbps PCM frame.

While a call might be carried over a circuit-switched network, the call might alternatively be carried over a packet switched network. For example, two wireless devices might be served by respective access points with the access points in turn communicatively coupled via a packet-switched network rather than the PSTN. In calls between the wireless devices where the wireless devices both support the same compressed digital format, the transcoders might similarly be bypassed so that the voice or media is then carried through the packet-switched network in the original compressed digital format to provide "transcoder free operation" for the call. Vocoder bypass is generally used to refer to bypassing transcoders in calls between wireless devices, with tandem-free operation and transcoder-free operation referring to the more specific cases when the calls are completed over circuit-switched and packet-switched networks respectively.

These vocoder bypass approaches still have disadvantages. For example, a first wireless device might include a higher compression vocoder (e.g., SMV), while a second wireless device might support a lower compression vocoder (e.g., EVRC). In negotiating to provide vocoder bypass, the wireless devices might both default to using the less efficient vocoder. In this case, the first wireless device would not then be able to use its more efficient vocoder, thereby using a larger amount of bandwidth on its air interface with an access point. Accordingly, there is still a need to provide efficient systems and methods for vocoder bypass.

SUMMARY OF THE INVENTION

A first access point may serve wireless devices located within a first coverage area of a wireless wide area network. In establishing a call between a first wireless device served by the first access point and a second wireless device served by a second access point, a load of the first coverage area may be used to select between vocoders used during the call. For example, if the load of the first coverage area is above a predetermined threshold, a first vocoder might be used for communications between the first access point and the first wireless device. However, if the load of the first coverage area is not above the predetermined threshold, then a second vocoder might be used for communications between the first access point and the first wireless device.

In one embodiment, the first vocoder is a higher compression vocoder than the second vocoder, and the first wireless device supports both vocoders while the second wireless device only supports the lower-compression second vocoder.

When the load of the first coverage area is high, the higher-compression first vocoder can be used for communications between the first wireless device and the first access point. However, when the load of the first coverage area is low, the lower-compression second vocoder can be used for communications between the first wireless device and the first access point. Regardless of the load in the first coverage area, the second vocoder can also be used for communications between the second wireless device and the second access point.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
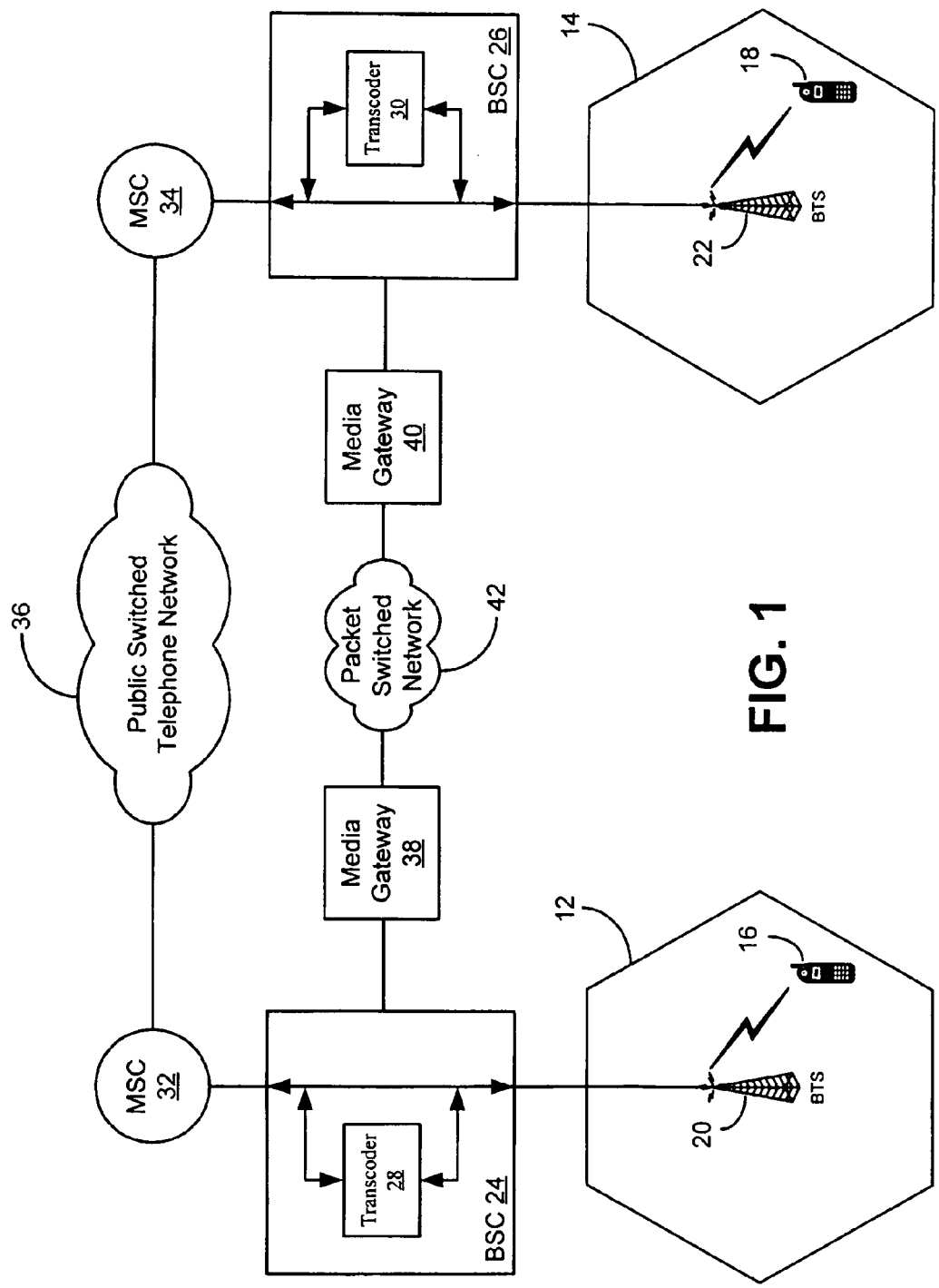
FIG. 1 is a block diagram of an exemplary wireless wide area network in which the load of a first coverage area may be used as a basis to select vocoders used in calls.

A load of a coverage area in a wireless wide area network can be used as a basis to select vocoders used in calls between wireless devices. For example, wireless devices within a first coverage area may communicate with a first access point in order to access the wireless wide area network for voice and/or data services. Wireless devices within a second coverage area may similarly access the wireless wide area network through a second access point. A first wireless device in the first coverage area may support a first vocoder and second vocoder, and the first vocoder may be a higher compression vocoder than the second vocoder. However, a second wireless device in the second coverage area may support the lower compression second vocoder but not the higher compression first vocoder.

The load of the first coverage area can be used to determine whether to use the first or second vocoders for communications during the call between the first access point and the first wireless device. The load of the first coverage area might be measured in a variety of different ways, such as the number of wireless devices being served by the first access point, the amount of bandwidth being used by wireless devices being served by the first access point, or the amount of unused bandwidth available to be allocated to wireless devices. These are merely examples, and other measures for the load of the first coverage area might also be used.

In one embodiment, when the load of the first coverage area is above a predetermined threshold, the call may be established to use the first vocoder for communications between the first wireless device and the first access point. As the second wireless device does not support the first vocoder, the second vocoder is then used during the call for communications between the second wireless device and the second access point. In one embodiment, PCM might be used to carry the call over an intermediate transport network, while in another embodiment the call might remain encoded while it is transported over the intermediate transport network. While using the vocoders in this manner results in a mismatch between the different vocoders used by the two wireless devices, it may advantageously allow the first access point to conserve its remaining available bandwidth during heavy load times by using the more efficient first vocoder to communicate with the first wireless device.

When the load is below the predetermined threshold, the first access point might have more available bandwidth to allocate among wireless devices currently being served by the first access point or wireless devices subsequently attempting to access the wireless wide area network through the first access point. Thus, conservation of network resources by the first access point might not be as high a priority. In this case, the first access point may then use the lower compression second vocoder for communications with the first wireless device. As the second wireless device also support the lower compression second vocoder, the call can then be established to provide vocoder bypass thereby advantageously reducing the inefficiencies that might otherwise result from using transcoders in the call path.

2. Exemplary Architecture

FIG. 1 is a block diagram of an exemplary wireless wide area network in which the load of a first coverage area may be used as a basis to select vocoders used in calls. As depicted in figure, the wireless wide area network includes a first coverage area 12 and a second coverage area 14. A first wireless device 16 is located within the first coverage area 12, and a second wireless device 18 is located within the second coverage area 14. While FIG. 1 depicts a single wireless device within each coverage area 12, 14, the two coverage areas 12, 14 may each include a greater or fewer number of wireless devices.

The wireless devices 16, 18 may access the wireless wide area network for voice and/or data services. The wireless devices 16, 18 may be wireless telephones, wireless personal digital assistants ("PDAs"), two way radios, wirelessly equipped laptop computers, or other devices that are able to transmit and receive voice or other media over an air interface. In the wireless wide area network, each wireless coverage area may include one or more access points with which wireless devices can communicate in order to access the wireless wide area network.

In one embodiment, the wireless wide area network is a wireless telecommunications network and the access points are base transceiver stations ("BTSs"). The wireless coverage areas can then be sectors of the wireless telecommunications network. In this embodiment depicted in FIG. 1, a first BTS 20 serves wireless devices within the first coverage area 12, and a second BTS 22 serves wireless devices within the second coverage area. Although FIG. 1 depicts only two BTSs, the network may optionally include a greater number of BTSs. Also, the wireless devices 16 and 18 may be able to roam into other coverage areas and to communicate with other BTSs, and they may be able to roam to other wireless wide area networks. Each BTS 20, 22 may additionally communicate with more than one wireless device.

The wireless devices 16, 18 and the BTSs 20, 22 may respectively communicate with each other using the same air interface protocol or using different air interface protocols. The BTSs 20 and 22 preferably communicate with the wireless devices 16, 18 using code division multiple access ("CDMA"). CDMA is described in further detail in the Telecommunications Industry Association ("TIA") standards IS-95A and IS-95B. CDMA is also described in the International Telecommunications Union ("ITU") IMT-2000 series of standards. CDMA is further described in the TIA IS-2000 series of standards. The IS-2000 series of standards are commonly referred to as CDMA2000.

Other protocols might also be used. For example, Wideband CDMA ("WCDMA"), Time Division Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Time Division Multiple Access ("TDMA"), Frequency Division Multiple Access ("FDMA") or other might alternatively be used. Additional wireless protocols, such any of those protocols under the Institute of Electrical and Electronics Engineers ("WEE") 802.11 umbrella, Bluetooth or others might also be used.

Base station controllers ("BSCs") 24, 26 connect to the BTSs 20, 22, respectively. While FIG. 1 shows the BSCs 24, 26 connected to only one BTS each, the BSCs 24, 26 may each be connected to a plurality of BTSs. The BSCs 24, 26 may be used to control the BTSs to which they are connected. The BSCs 24, 26 may also each include respective transcoders 28, 30 for converting between media formats, as described in more detail below. Although FIG. 1 shows the transcoders 28 and 30 as being located in BSCs 24, 26 respectively, transcoders 28 and 30 could be located in other network elements.

Mobile switching centers ("MSCs") 32, 34 connect to the BSCs 24, 26, respectively. Although FIG. 1 shows the MSCs 32, 34 connected to only one BSC each, the MSCs 32, 34 may each be connected to a plurality of BSCs. The MSCs 32, 34 function to connect calls to and from wireless devices via BSCs and BTSs. In this regard, the MSCs 32, 34 are connected to a circuit-switched telephone network, e.g., the public switched telephone network ("PSTN") 36 and may use a signaling system, such as SS7, to setup calls through the PSTN 36.

By using appropriate SS7, IS-41, and/or other signaling, the MSC 32 may connect incoming calls from the PSTN 36 to wireless devices operating in areas served by associated BTSs. Such calls may originate from landline telephones, wireless devices or other devices. Similarly, the MSC 32 may connect calls originating from wireless devices operating in areas served associated BTSs to their destinations, via the PSTN 36. Such destinations may include landline telephones, wireless devices or other devices. The other MSC 34 may also connect calls in a similar manner.

In many cases, wireless devices may transmit and receive media, such as voice, in a format different than the format in which media is carried in the PSTN 36. In particular, the PSTN 36 may carry media in a pulse code modulation ("PCM") format, whereas the wireless devices 16, 18 may transmit and receive media in a compressed digital format. The compressed digital format could be, for example, the Enhanced Variable Rate Codec ("EVRC") format or the Selectable Mode Vocoder ("SMV") format. However, other compressed digital formats could be used.

Each BSC 24, 26 may include a respective transcoder 28, 30 that is used for converting between the different media formats used by wireless devices and by the PSTN 36. The first transcoder 28 may convert between the compressed digital format used by wireless devices served by the BTS 20 and the PCM format used by PSTN 36. Similarly, the second transcoder 30 may convert between the compressed digital format used by wireless devices served by the BTS 22 and the PCM format used by the PSTN 36.

The transcoders 28, 30 may each support one or more compressed digital formats. In one embodiment, the transcoders 28, 30 both support EVRC and SMV. Thus, the transcoders 28, 30 can service wireless devices that use one or both of these compressed digital formats. Similarly, wireless device might support one or both of these compressed digital formats. For example, the first wireless device 16 might support both SMV and EVRC, while the second wireless device 18 might support EVRC but not SMV. It should be understood, however, that the wireless devices 16, 18 may use other compressed digital formats. Additionally, the transcoders 28, 30 might not necessarily support the same compressed digital formats as each other.

The transcoders 28, 30 may also be selectively bypassed. In particular, the BSCs 24, 26 may be able to convey media between their respective BTSs 20, 22 and MSCs 32, 34 either with or without transcoding. If both endpoints of a call use the same digital compression format, the MSCs 32, 34 may both bypass their respective transcoders 28, 30. For example, if the wireless devices 16, 18 both support EVRC and are the endpoints of the call, then the MSCs 32, 34 may control the BSCs 24, 26 to bypass their respective transcoders 28, 30. For example, the MSCs 32, 34 may engage in in-band signaling to establish a "transparent" TFO connection through the PSTN 36. Once the TFO connection is established, the MSCs 32, 34 may exchange EVRC, coded into specialized TFO frames, via PSTN 36.

In accordance with exemplary embodiments of the present invention, the BSCs 24, 26 may also be connected to respective media gateways 38, 40. The media gateways 38, 40 may be capable of conveying media in EVRC, SMV or other compressed digital formats. A packet-switched network 42 may interconnect the media gateways 38, 40. In an exemplary embodiment, the packet-switched network 42 may include one or more local area networks (LANs) and/or one or more wide area networks (WANs), such as the Internet. The BSCs 24, 26 may use their respective media gateways 38, 40 to convey media via the packet-switched network 42 without going through the PSTN 36. The media gateways 38, 40 may also convey the media via the packet switched-network 42 with or without transcoding.

The packet-switched network 42 may route packets based on network addresses, such as by using the Internet Protocol ("IP") protocol in combination with the User Datagram Protocol ("UDP") or Transmission Control Protocol ("TCP"). The IP packets may be carried over lower level protocols, such as asynchronous transfer mode ("ATM") protocols. In addition, higher-level applications and protocols, such as the Session Initiation Protocol ("SIP"), may be carried as UDP/IP or TCP/IP packets. Relevant aspects of SIP are described in Rosenberg, et al., "SIP: Session Initiation Protocol," Request for Comments 3261 (June 2002).

Voice or other media may be carried in alternative network, 42 in a real-time packet media format, e.g., by using the real-time transport protocol ("RTP"). More particularly, the packet-switched network 42 may carry the media transmitted by wireless devices in the original compressed digital format, using RTP. Relevant aspects of RTP are described in Schulzrinne, et al., "RTP: A Transport Protocol for Real-Time Applications," Request for Comments 1889 (January 1996).

3. Exemplary Operation

Figure 2:
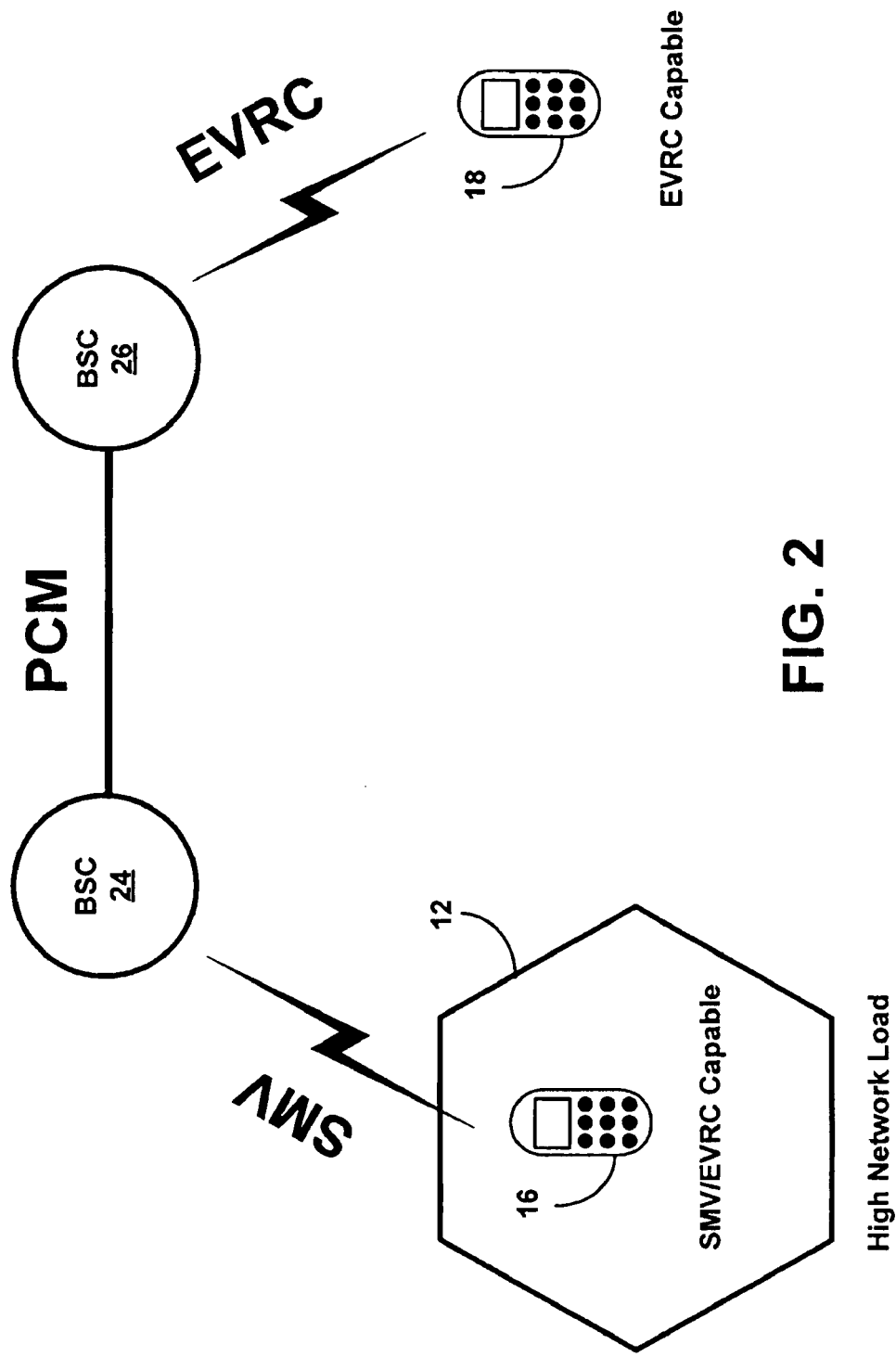
FIG. 2 is a block diagram illustrating exemplary vocoder usage in a call between wireless devices when the load of the first coverage area is above a predetermined threshold.

FIG. 2 is a block diagram illustrating exemplary vocoder usage in a call between wireless devices when the load of the first coverage area is above a predetermined threshold. For simplicity, this figure is a general logical depiction of points along a call path where translation between different compressed digital formats (e.g., SMV, EVRC) or between a compressed digital format and a non-compressed format (e.g., PCM, TDM) occurs. Other elements in the call path, such as those depicted in FIG. 1, are omitted.

In this example, the first coverage area 12 has a high network load. That is, the load of the first coverage area 12 is above a predetermined threshold. As previously described, the threshold may be established based on the number of wireless devices currently being served by the first access point 20, the available bandwidth left for the first access point 20 to allocate to wireless devices, the bandwidth already allocated to wireless devices by the first access point 20 or some other measure. The predetermined threshold is preferably specified in the first BSC 24 or the first MSC 32, but it may alternatively be specified at the first access point 20 or at other locations.

As further depicted, the first wireless device 16 may be capable of using first (e.g., SMV) and second (e.g., EVRC) vocoders, while the second wireless device 18 may be capable of using the second vocoder but not the first vocoder. It should be understood that these vocoders are merely examples and others might alternatively be used. The particular vocoder selected for use between the first access point 20 and the first wireless device 16 is dependent on the load of the first coverage area 12, since in this example it is the first coverage area 12 that has a high network load.

The first wireless device 16 can initiate a call or other type of connection by sending a request to the first access point 20. The request preferably includes an identification of all the vocoders that the first wireless device 16 supports, although the identification of all the vocoders that the wireless device 16 supports might alternatively be sent separately from the original call request. The first access point 20 can then notify the first BSC 24 of the request and the identification of vocoders supported by the first wireless device 16, and the first BSC 24 can in turn pass this information to the first MSC 32. This allows the first BSC 24, first MSC 32 or other entities involved in establishing the call to determine which vocoders the first wireless device 16 supports.

The first BSC 24 and/or first MSC 32 may routinely monitor the network load and store the current network load. Upon receiving an indication to initiate a call, the first BSC 24 and/or first MSC 32 can determine whether the network load is above the predetermined threshold without needing to subsequently obtain additional information about the current network load. Alternatively, a network entity other than the first BSC 24 and/or first MSC 32 may monitor the network load. In response to receiving an indication to establish a call with the first wireless device 16, the first BSC 24 and/or first MSC 32 may query this other entity to dete ine the current network load, which one or both of them can then use to determine whether the current network load exceeds the predetermined threshold.

In one embodiment, the first BSC 24 monitors and stores the current network load. In response to receiving a request to establish a call with the first wireless device 16, the first BSC 24 may notify the first MSC 32 of the request. The first BSC 24 may also automatically provide the first MSC 32 with the current network load, which the first MSC 32 can use directly to determine if it exceeds the predetermined threshold. In an alternate embodiment, the first BSC 24 stores an indication of the predetermined threshold along with the current network load. The first BSC 24 might then set a flag in a message sent to the first MSC 32 in order to notify the first MSC 32 that the network load exceeds the predetermined threshold.

Since the network load is above the predetermined threshold, the first MSC 32 operates to establish the call to use the first vocoder for communications between the between the first access point 20 and the first wireless device 16. The first MSC 32 can communicate with the second MSC 34 in order to establish the call between the wireless devices 16, 18. As part of this process, the first MSC 32 can send an indication to the second MSC 34 to establish the call. The MSCs 32, 34 can then subsequently negotiate the particular parameters of the call, including which vocoders are to be used by the wireless device 16, 18 and whether the call is established to provide vocoder bypass.

To negotiate vocoder usage, the first MSC 32 can send the second MSC 34 an indication of the one or more vocoders supported by the first wireless device 16. The second MSC 34 can additionally receive an indication of the vocoders supported by the second wireless device 18. For example, as part of the call establishment process, the second wireless device 18 can send the second access point 22 a list of the vocoders it supports. The second access point 22 can then provide this list to the second MSC 34, such as through the second BSC 26 and/or other intermediate network elements. The second MSC 34 can then compare the vocoders supported by the first wireless device 16 against the vocoders supported by the second wireless device 18 to determine which vocoders to use in the call and whether the call can be established to provide vocoder bypass.

Where the network load is below the predetermined threshold, the first MSC 32 can send the second MSC 34 an indication of all the vocoders supported by the first wireless device 16. The second MSC 34 can in turn query the second wireless device 18 to determine which vocoders it supports. The second MSC 34 can then compare the list of all vocoder supported by the second wireless device 18 against the list of all vocoders supported by the first wireless device 16 in order to determine whether the call can be established to provide vocoder bypass. That is, the second MSC 34 can determine whether both wireless devices 16, 18 support one or more of the same vocoders. The second MSC 34 can then send the first MSC 32 an indication of which vocoder should be used and whether the call can be established to provide vocoder bypass.

Where the network load is above the predetermined threshold, as it is in this example, the first MSC 32 might not send the second MSC 34 a list of all the vocoders supported by the first wireless device 16. Rather, the first MSC 32 might only send the second MSC 34 an indication of the particular vocoder (e.g., SMV) it determines that the first wireless device 16 should use for the call rather than an indication of all the vocoders (e.g., SMV and EVRC) supported by the first wireless device 16. If the second wireless device 18 supports that vocoder, then the call can be established to provide vocoder bypass. If the second wireless device 18 does not support that vocoder, then the second MSC 34 detects a vocoder mismatches and determines that the call cannot be established to provide vocoder bypass. This may be in spite of the fact the wireless devices 16, 18 might actually both support a particular vocoder (e.g., EVRC) and therefore the call could be established to provide vocoder bypass. Thus, the first MSC 32 can force the mismatch by only identifying the one particular vocoder (e.g., SMV) rather than identifying all the vocoders supported by the first wireless device 16.

Once the second MSC 34 determines which vocoder to use, it can provide that information to the second BSC 26, the second access point 22 and the second wireless device 18. As previously described, the second MSC 34 can also provide that information to the first MSC 32. Additionally, once the first MSC 32 receives from the second MSC 34 the indication of which vocoder to use and whether the call will be established with vocoder bypass, the first MSC 32 can in turn provide this information to the first BSC 24, the first access point 20 and the first wireless device 16. And, the MSCs 32, 34 and other network elements can then proceed to establish the call accordingly.

This example describes an exemplary operation in which the originating end of a call has the high network load, and therefore the first MSC 32 at the originating end of the call forces a vocoder mismatch. In another exemplary operation, however, the terminating end of the call might have the high network load. In that case, the originating MSC might send the terminating MSC a list of all the vocoders supported by the wireless device at the originating end. The MSC at the terminating end can then obtain a list of vocoders supported by the wireless device at the terminating end. Based on the high network load, the terminating MSC can determine that the wireless device at the terminating end should use a particular vocoder. If the wireless device at the originating end also supports that vocoder, the terminating MSC can signal to the originating MSC to use that vocoder and establish the call to provide vocoder bypass. However, if the wireless device at the original end does not support that vocoder, the terminating MSC might force a mismatch, thereby establishing the call to have the wireless device at the terminating end to use the higher compression vocoder. This may be in spite of the fact that the call could actually be established to provide vocoder bypass if a lower compression vocoder were selected.

Returning to this example, since there is a forced vocoder mismatch and the call is not established to provide vocoder bypass, a translation entity must then convert between the SMV format used by the first wireless device 16 and another format. As illustrated in FIG. 2, the BSC 24 serves as one translation entity in the call path to convert between SMV and another format. Thus, SMV would be used for communications between the BSC 24 and the first wireless device 16 via any intermediate entities, such as the first access point 20. For example, SMV would be used between the first wireless device and the first access point 20 and also between the first access point 20 and the first BSC 24.

A variety of formats might be used between the BSCs 24, 26. For example, the BSCs 24, 26 may communicate via the PSTN 36, and the call traffic between them might be encoded using PCM. The first BSC 24 would then receive call traffic originating from the first wireless device 16 that is encoded using SMV and convert that call traffic to PCM for transmission to the second BSC 26. Similarly, the first BSC 24 would receive call traffic encoded using PCM from the second BSC 26 encoded using PCM and then convert that call traffic to SMV for transmission to the first wireless device 16.

The second BSC 26 associated with the second access point 22 serving the second wireless device 18 might perform a similar function. It might receive call traffic originating from the second wireless device 18 that is encoded using EVRC and then convert that call traffic to PCM for transmission to the first BSC 26. The second BSC 26 would also receive call traffic from the first BSC 24 encoded using PCM and convert the call traffic to EVRC for transmission to the second wireless device 18. It should be understood, however, that using the BSCs 24, 26 as translation entities in the call path is merely exemplary in nature. Other elements, such as the MSCs 32, 32, the media gateways 38, 40 or other elements might also be configured to serve as translation entities depending on the routing of the call, the particular wireless wide area network implementation or other factors.

In this example, call traffic between the first wireless device and the first BSC 24 generally uses SMV, call traffic between the two BSCs 24, 26 generally uses PCM, and call traffic between the second BSC 26 and the second wireless device 18 generally uses EVRC. Although this creates a mismatch between the vocoders used by the wireless devices and prevents the call from being established to provide vocoder bypass, it advantageously allows the first BTS 20 to use the more efficient first vocoder rather than the less efficient second vocoder during times when the first coverage area 12 experiences a high network load. This can conserve available resources, such as available bandwidth between the first access point 20 and wireless devices in the first coverage area 12, thereby potentially allowing the access point 20 to serve more wireless devices that might otherwise be denied service or to allocate more bandwidth to wireless devices that it is currently serving. Other advantages might also exist.

Figure 3:
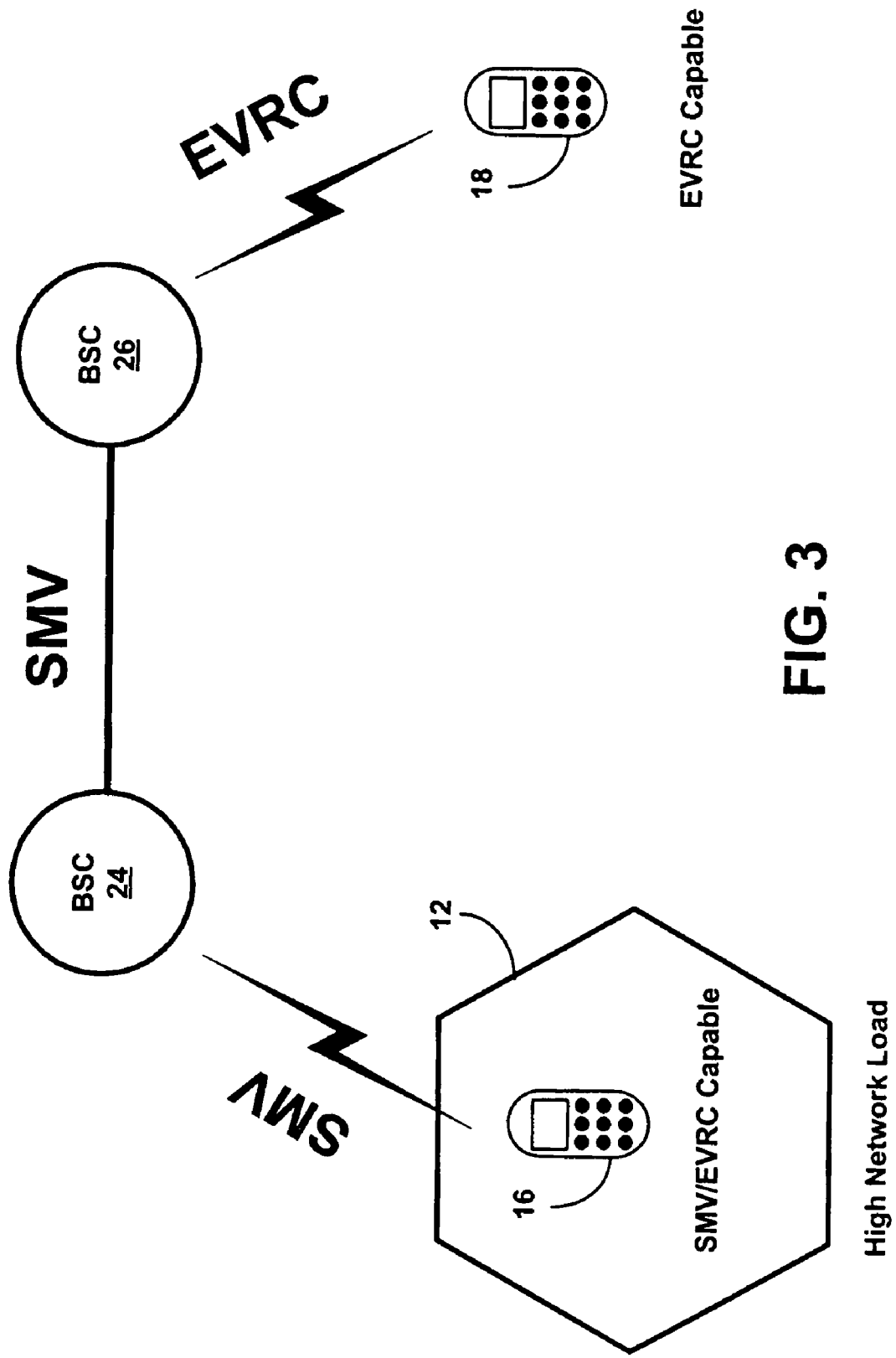
FIG. 3 is a block diagram illustrating alternate vocoder usage in a call between wireless devices when the load of the first coverage area is above a predetermined threshold.

FIG. 3 is a block diagram illustrating alternate vocoder usage in a call between wireless devices when the load of the first coverage area is above a predetermined threshold. Similar to the previous figure, FIG. 3 is a general logical depiction of points in the call path where translation between different compressed digital formats occurs. And, it again depicts exemplary vocoder usage for when the first coverage area 12 has a high network load and for when the first wireless device 16 supports first and second vocoders but the second wireless device 18 only supports the lower compression second vocoder.

As illustrated in this figure, the higher-compression first vocoder is used for communications between the first BSC 24 and the first wireless device, while the lower-compression second vocoder is used for communications between the second BSC 26 and the second wireless device 18. In this alternate embodiment, the first vocoder is also used for communications between the first BSC 24 and the second BSC 26. Thus, the first BSC 24 would not need to translate between SMV and another format. The second BSC 26 would perform translation between the first and second vocoders.

The second BSC 26 would receive call traffic from the first BSC 26 encoded using SMV, and it would translate that call traffic to EVRC for transmission to the second wireless device 18. The second BSC 26 would also receive call traffic originating from the second wireless device 18 and encoded using EVRC, and it would convert that call traffic to SMV for transmission to the first BSC 24. Using the first vocoder for call traffic between the first and second BSCs 24, 26 in this manner might advantageously conserve bandwidth on the link between them.

Figure 4:
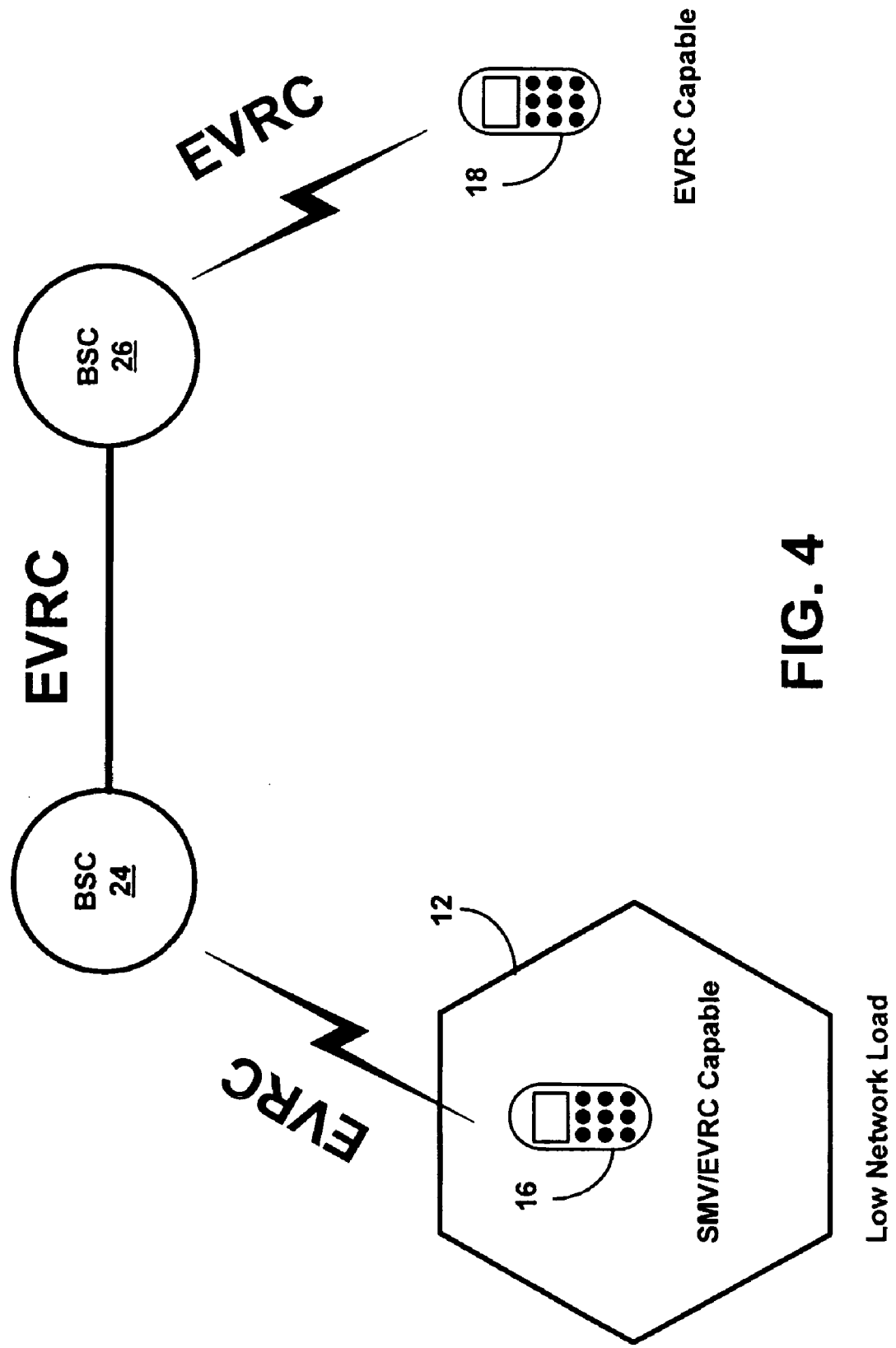
FIG. 4 is a block diagram illustrating exemplary vocoder usage in a call between wireless devices when the load of the first coverage area is not above a predetermined threshold.

FIG. 4 is a block diagram illustrating exemplary vocoder usage in a call between wireless devices when the load of the first coverage area is not above a predetermined threshold. As illustrated in this example, the first coverage area 12 has a low network load. For example, the load might not be above the predetermined threshold. Accordingly, the second vocoder may then be selected for use in communications between the first BTS 20 and the first wireless device 12. As the second vocoder is supported by the second device 18, and therefore can be used for communications between the second BTS 22 and the second wireless device 18, the call can be established to provide vocoder bypass.

As illustrated, EVRC can then be used for communications between the first wireless device and the first BCS 24, the first BCS 24 and the second BCS 26, and the second BCS 26 and the second wireless device 18. Thus, the first and second BSCs 24, 26 would not need to translate between different compressed or uncompressed formats.

Figure 5:
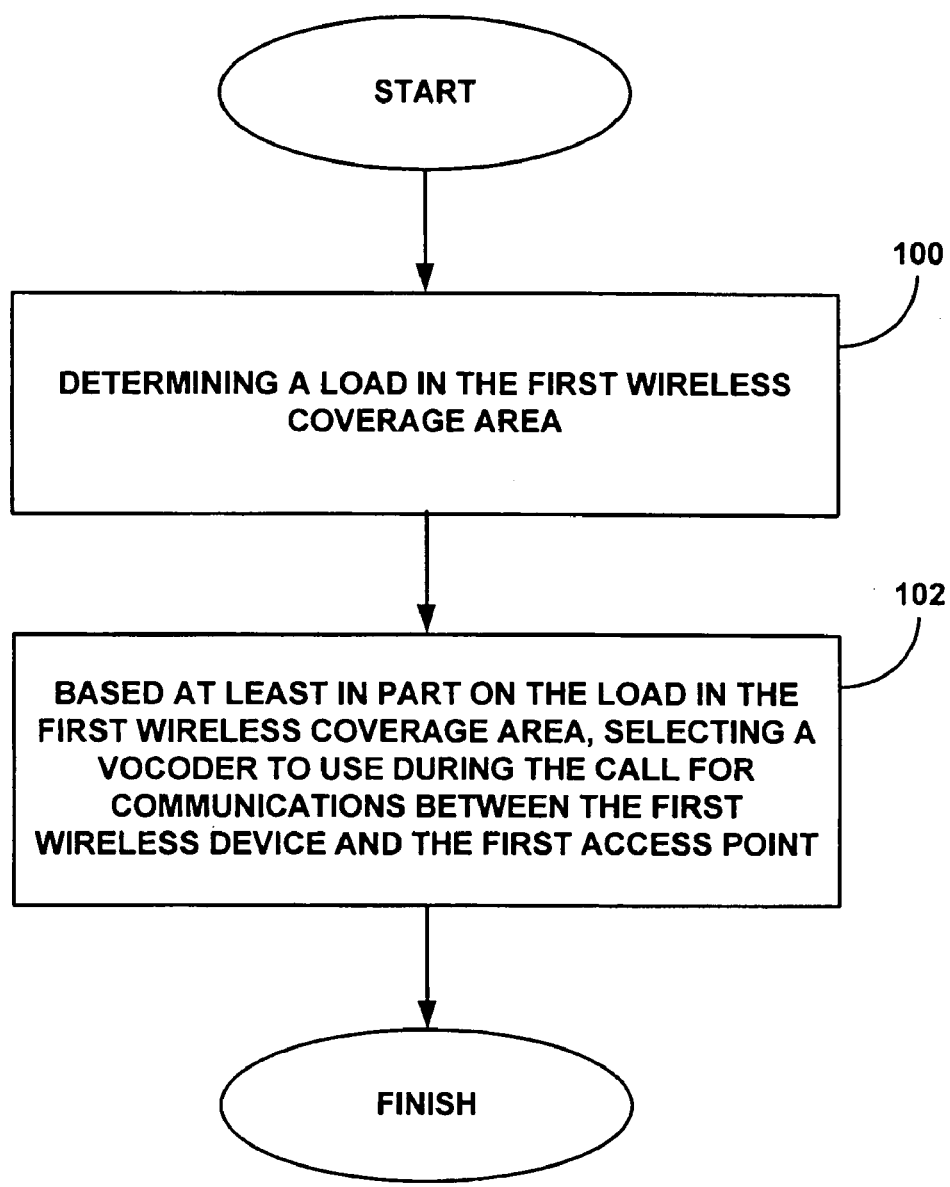
FIG. 5 is a flowchart illustrating an exemplary method for using the load of the first coverage area to selectively choose between vocoders used in calls.

FIG. 5 is a flowchart illustrating an exemplary method for using the load of the first coverage area to selectively choose between vocoders used in calls. The method may be used to establish a call between a first wireless device and a second wireless device. The first wireless device may operate in a first wireless coverage area served by a first access point, and the second wireless device may operate in a second wireless coverage area served by a second access point. At Step 100, a network element determines a load in a first wireless coverage area. Based at least in part on the load in the first wireless coverage area, the network element may select a vocoder to use during the call for communications between the first wireless device and the first access point, as shown at Step 102.

For example, if the load exceeds a threshold, the network element may select a first vocoder to use, and if the load does not exceed the threshold, then the network element may select a second vocoder to use. The first vocoder may be a higher compression vocoder than the second vocoder. The method may also include the network element determining that the first wireless device supports both the first and second vocoders, and it may also include the network element determining that the second wireless device supports the second vocoder but not the first vocoder.

Figure 6:
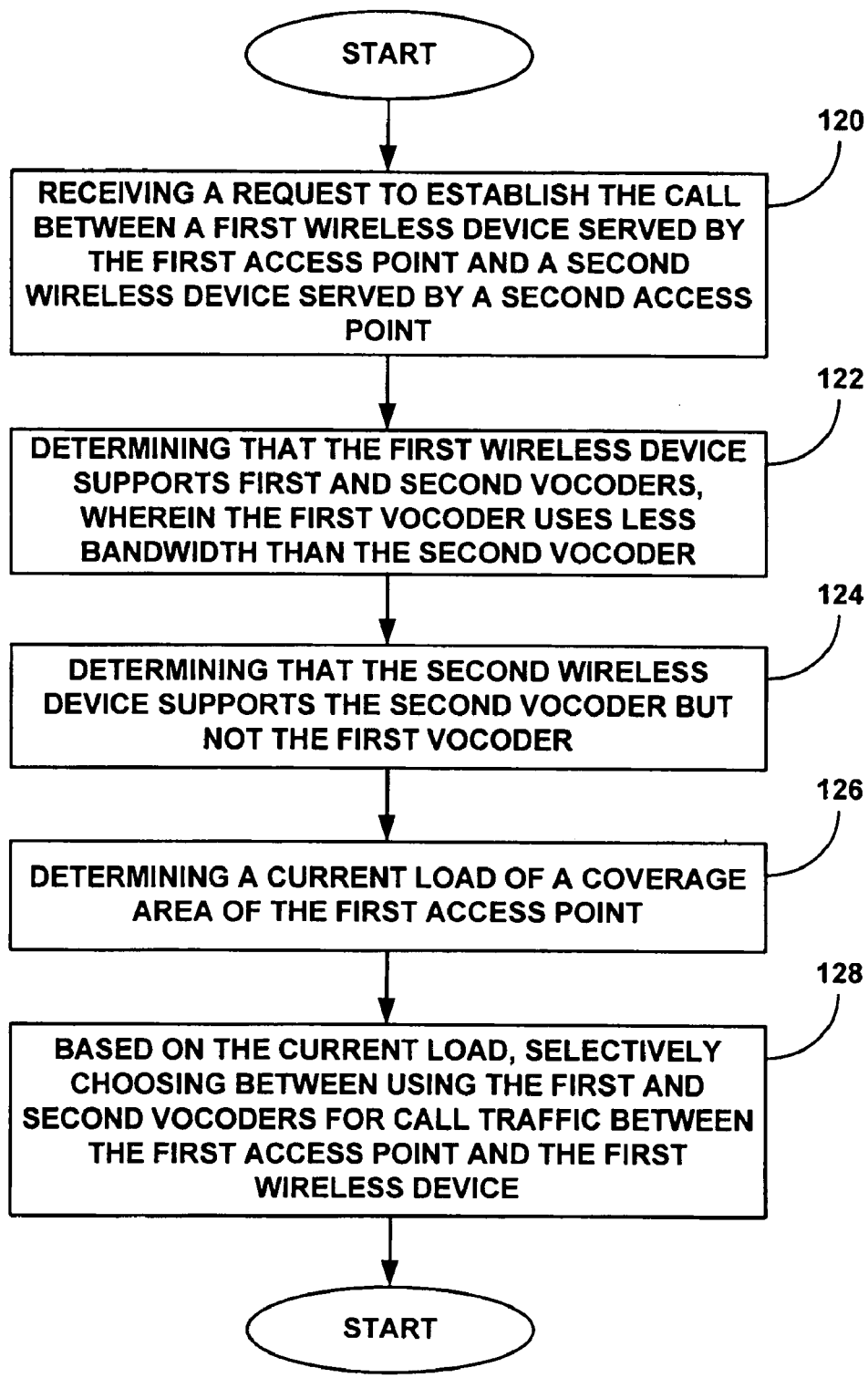
FIG. 6 is a flowchart illustrating an exemplary method for a first mobile switching center associated with a first access point in a wireless wide area network to negotiate the use of vocoders in a call.

FIG. 6 is a flowchart illustrating an exemplary method for a first mobile switching center associated with a first access point in a wireless wide area network to negotiate the use of vocoders in a call. At Step 120, the first MSC receives a request to establish a call between a first wireless device served by the first access point and a second wireless device served by a second access point. At Step 122, the first MSC determines that the first wireless device supports the first and second vocoders, where the first vocoder uses less bandwidth than the second vocoder. At Step 124, the first MSC determines that the second wireless device supports the second vocoder but not the first vocoder.

At Step 126, the first MSC determines a current load of a coverage area of the first access point. Based on the current load, the first MSC selectively chooses between using the first and second vocoders for call traffic between the first access point and the first wireless device, as show at Step 128. For example, the first MSC might use the first vocoder if the current load is a above a preset threshold, otherwise the first MSC might use the second vocoder. The method might optionally include other steps.

For example, the method might further include the first MSC determining that the current load is not above a preset threshold and responsively using the second vocoder for call traffic between the first access point and the first wireless device. The first MSC might also negotiate with a second base station controller associated with the second access point to use the second vocoder for call traffic between the second access point and the second wireless device, thereby providing vocoder bypass for the call.

In another example, the method might further include the first MSC determining that the current load is above a preset threshold and responsively using the first vocoder for call traffic between the first access point and the first wireless device. The first MSC might also negotiate with a second MSC associated with the second access point to use the second vocoder for call traffic between the second access point and the second wireless device. Additionally, the first MSC might negotiate with the second MSC to use the second vocoder or to use PCM for call traffic between first and second BSCs or on other legs of the call.

It should be understood that the programs, processes, methods and apparatus described herein are not related or limited to any particular type of computer or network apparatus (hardware or software), imless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method in a wireless wide area network, the method comprising:

receiving a request to originate a call from a first wireless device to a second wireless device, wherein the first wireless device is in a first coverage area served by a first access point of a first serving system and the second wireless device is in a second coverage area served by a second access point of a second serving system;

determining a current load of the first coverage area;

based on the current load of the first coverage area, the first serving system selecting a plurality of first-device vocoders that are supported by the first wireless device;

the first serving system sending an indication of the plurality of first-device vocoders to the second serving system;

the second serving system determining one or more second-device vocoders that are supported by the second wireless device;

the second serving system comparing the plurality of first-device vocoders against the one or more second-device vocoders to determine whether any of the first-device vocoders match any of the second-device vocoders; and in response to a vocoder match, the second serving system sending the first serving system an indication that the call can be established with vocoder bypass and an indication of which vocoder in the plurality of first-device vocoders to use for the call.

2. The method of claim 1, further comprising establishing the call with vocoder bypass via a packet-switched network, wherein establishing the call with vocoder bypass comprises establishing the call with transcoder-free operation.

3. The method of claim 1, further comprising establishing the call with vocoder bypass via a circuit switched network, wherein establishing the call with vocoder bypass comprises establishing the call with tandem free-operation.

4. The method of claim 1, wherein determining a current load of the first coverage area comprises determining a number of wireless devices being served by the first access point.

5. The method of claim 1, wherein determining a current load of the first coverage area comprises determining an amount of unused bandwidth available to allocate to wireless devices.

6. The method of claim 1, wherein determining a current load of the first coverage area comprises determining an amount of bandwidth allocated to wireless devices being served by the first access point.

7. The method of claim 1, further comprising:
    identifying all supported vocoders that are supported by the first wireless device; and
    comparing the current load of the first coverage area to a predetermined threshold.

8. The method of claim 7, wherein based on the current load of the first coverage area, selecting a plurality of first-device vocoders supported by the first wireless device comprises:
    determining that the current load of the first coverage area is below the predetermined threshold; and
    in response, selecting all of the supported vocoders as the plurality of first-device vocoders.

9. The method of claim 7, wherein based on the current load of the first coverage area, selecting a plurality of first-device vocoders supported by the first wireless device comprises:
    determining that the current load of the first coverage area is above the predetermined threshold; and
    in response, selecting less than all of the supported vocoders as the plurality of first-device vocoders.

10. The method of claim 7, wherein the supported vocoders include a Selectable Mode Vocoder and an Enhanced Variable Rate Codec.

11. The method of claim 1, wherein the first serving system comprises a first mobile switching center (MSC) and the second serving system comprises a second MSC.

12. The method of claim 1, wherein the second serving system determining one or more second-device vocoders that are supported by the second wireless device comprises:
    the second serving system determining that the second wireless device should use a particular vocoder based on a current load of the second wireless coverage area.

13. The method of claim 1, wherein the indication of which vocoder in the plurality of first-device vocoders to use for the call comprises an indication of a particular second-device vocoder that matches one of the plurality of first-device vocoders.

14. The method of claim 13, wherein the one or more second-device vocoders comprises a plurality of second-device vocoders.

* * * * *